United States Patent [19]

Ogusu et al.

[11] Patent Number: 5,799,118
[45] Date of Patent: Aug. 25, 1998

[54] INTEGRATED OPTICAL MULTIPLEXER-AND-DEMULTIPLEXER

[75] Inventors: Masahiro Ogusu, Tokyo; Shigeru Ohshima, Yokohama, both of Japan

[73] Assignee: Kabushiki Kaisha Toshiba, Kawasaki, Japan

[21] Appl. No.: 684,212

[22] Filed: Jul. 19, 1996

[30] Foreign Application Priority Data

Jul. 28, 1995 [JP] Japan .................................. 7-193454

[51] Int. Cl.$^6$ ............................................. G02B 6/12
[52] U.S. Cl. ............................................. 385/14
[58] Field of Search ........................ 385/11–14, 17, 385/37, 4, 6, 49, 147; 359/124, 128–130, 120, 333

[56] References Cited

U.S. PATENT DOCUMENTS

| | | | |
|---|---|---|---|
| 4,715,027 | 12/1987 | Mahapatra et al. | 385/14 X |
| 4,739,501 | 4/1988 | Fussganger | 385/33 X |
| 4,993,032 | 2/1991 | Bradley | 372/20 |
| 5,136,671 | 8/1992 | Dragone | 385/37 |
| 5,355,237 | 10/1994 | Lang et al. | 385/37 X |

Primary Examiner—Akm E. Ullah
Attorney, Agent, or Firm—Oblon, Spivak, McClelland, Maier & Neustadt, P.C.

[57] ABSTRACT

An integrated optical multiplexer-and-demultiplexer comprising an arrayed waveguide having an optical delay portion imparting an optical band-pass characteristic, a lens secured to one end of the arrayed waveguide, and a diffraction grating opposing the lens. The optical delay portion is made of a light-transmitting medium selected from the group consisting of air and material composed of at least two substances exhibiting a minimum temperature coefficient to an optical length.

12 Claims, 9 Drawing Sheets

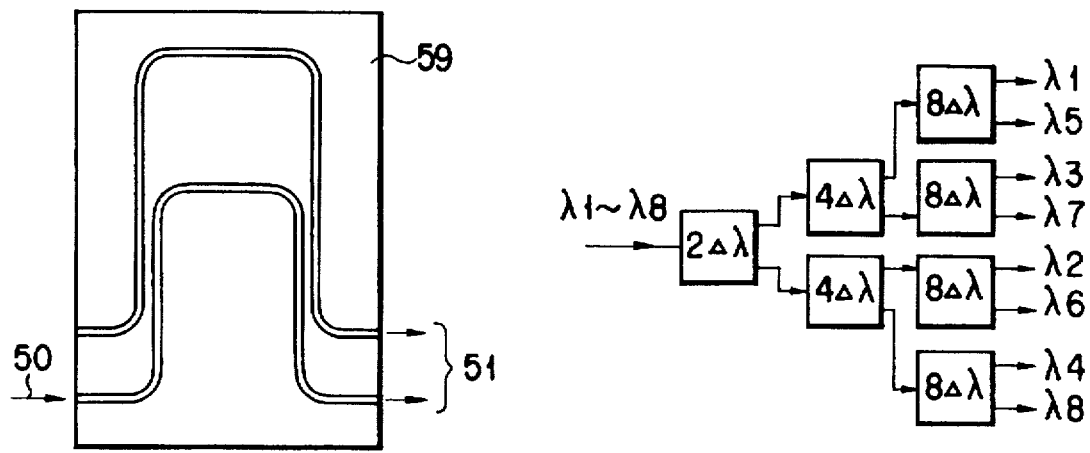
F I G. 12A
F I G. 13
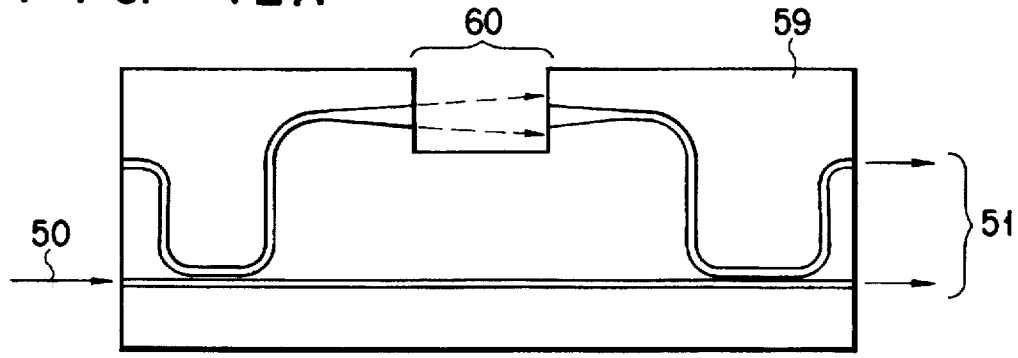
F I G. 12B
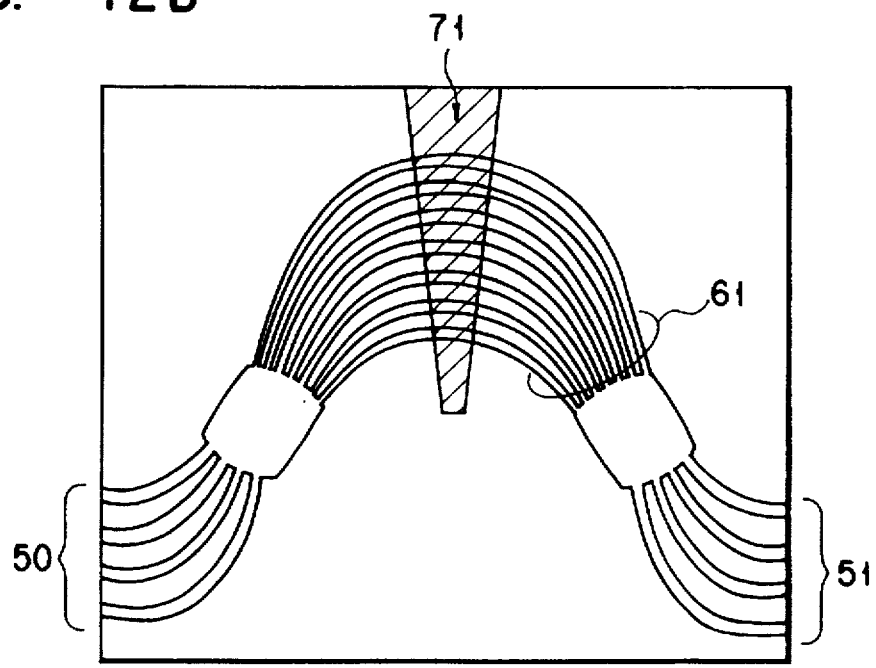
F I G. 14

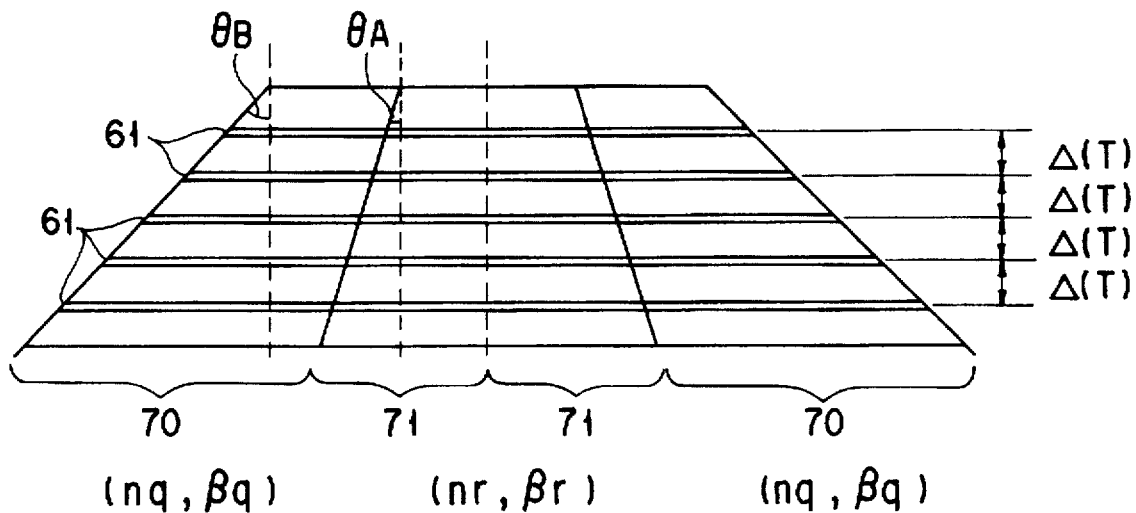
F I G. 15A
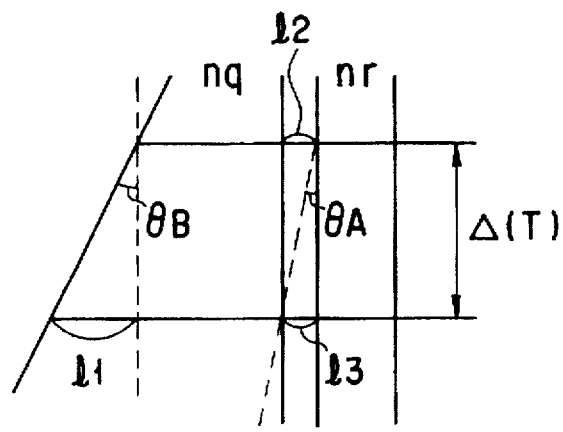
$$\Delta L = l_1 - l_2 + l_3 = nq\Delta(T)\tan\theta_B - nq\Delta(T)\tan\theta_A$$
$$+ nr\Delta(T)\tan\theta_A$$
F I G. 15B

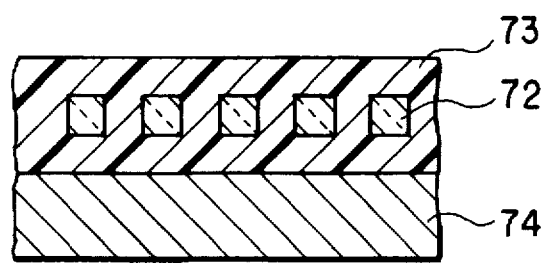
F I G. 16
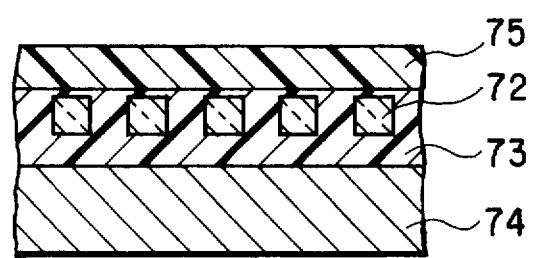
F I G. 17A
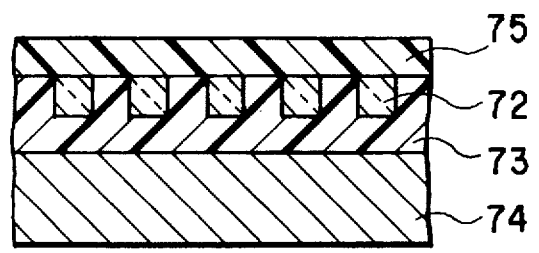
F I G. 17B
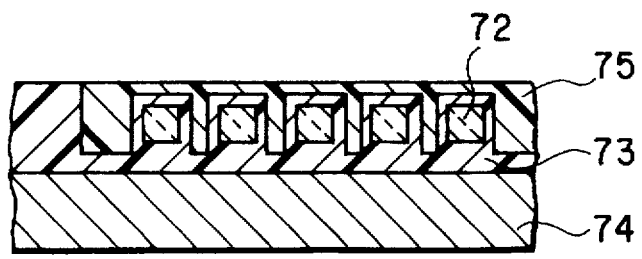
F I G. 17C

INTEGRATED OPTICAL MULTIPLEXER-AND-DEMULTIPLEXER

BACKGROUND OF THE INVENTION

1. Field of the Invention

The present invention relates to an integrated optical multiplexer-and-demultiplexer for use in, for example, high-density wavelength multiplex transmission, and more particularly to an integrated optical multiplexer-and-demultiplexer which has no temperature-adjusting section and which yet has improved temperature stability.

2. Description of the Related Art

Recent years saw a marked advance in communication technology. Much attention is paid to, in particular, high-density wavelength multiplex optical communication, which is expected to be applied to a large-capacity optical communication system in the near future. It is greatly demanded that the high-density wavelength multiplex optical communication be put to practical use.

In order to achieve a successful wavelength multiplex optical communication, the wavelength multiplex density must be increased to transmit a large amount of information over a long distance. To this end, an optical multiplexer-and-demultiplexer, for coupling transmitters for different channels with a single optical fiber and dividing an optical signal into optical signals of different wavelengths to supply these optical signals to receivers for the different channels, respectively, is indispensable to wavelength multiplex optical communication. More and more data will be transmitted over a longer distance than ever. An optical multiplexer-and-demultiplexer should therefore be provided which has an optical transmission characteristic sharp enough to reduce the channel-wavelength spacing and increase the transmission bandwidth and which is essentially stable even if the temperature changes.

The conventional optical multiplexer-and-demultiplexer comprises a diffraction grating, a lens and an arrayed waveguide which are connected in series. The waveguide has a plurality of array ports. The diffraction grating diffracts an optical signal applied to it, in the direction which corresponds to the wavelength of the optical signal. The optical signal thus diffracted is supplied to the lens, which converts the wavelength-angle dispersion of the signal to the wavelength-position dispersion thereof. The optical signal output from the lens is supplied to the arrayed waveguide. Of the array ports of the waveguide, the one assigned to the wavelength of the input optical signal receives the optical signal.

It is proposed that optical parts be arranged, one by one, in a micro optical rule, or be arranged on a waveguide substrate in the form of an integrated array, to manufacture a conventional optical multiplexer-and-demultiplexer. If either method is successfully performed, there will be manufactured an integrated optical multiplexer-and-demultiplexer with high productivity and in small size. Researches are now being conducted in increasing numbers to develop integrated optical multiplexer-and-demultiplexer.

To acquire a desirable optical band-pass characteristic, an optical multiplexer-and-demultiplexer needs to have an optical delay portion with respect to light beams having the same wavelength in the optical path. A Littrow optical multiplexer-and-demultiplexer has optical paths which guide light beams from the lens to the diffraction grating and which have different lengths. In an arrayed waveguide grating or the like, the arrayed waveguides is changed in length at a predetermined interval, and light beams are made to interfere at an interface between the slab waveguide and the three-dimensional waveguide, thus converting wavelength dispersion of optical signals to position dispersion thereof. In other words, the optical multiplexer-and-demultiplexer cannot realize its optical multiplex and demultiplex characteristics without applying an optical path difference to a light beam in the arrayed optical circuit between the interfaces on the both sides of the optical multiplexer-and-demultiplexer.

The optical length of the optical delay portion is the product of the optical path difference and the effective refractive index of the optical delay portion. Thus, the temperature dependency of the refractive index and the thermal expansion coefficient of the waveguide substrate determine how much stable the wavelength transmission characteristic of a multiplexer-and-demultiplexer can be despite changes in temperature. In the conventional integrated optical multiplexer-and-demultiplexer, the medium forming the optical delay portion has temperature dependency which is not sufficiently small. Changes in the central transmission wavelength are not less than the transmission bandwidth. This inevitably renders the transmitting-receiving characteristic of the communication system incorporating the optical multiplexer-and-demultiplexer.

As detailed above, no integrated optical multiplexer-and-demultiplexers have been made which can operate stably in spite of changes in temperature, without a massive temperature-adjusting section for adjusting the temperature of the entire waveguide substrate.

SUMMARY OF THE INVENTION

The object of the present invention is to provide an integrated optical multiplexer-and-demultiplexer which has no temperature-adjusting section and which yet exhibits much improved temperature stability.

According to the invention, there is provided an integrated optical multiplexer-and-demultiplexer which comprises an arrayed waveguide having an optical delay portion imparting an optical band-pass characteristic; a lens secured to one end of the arrayed waveguide, and a diffraction grating opposing the lens. The optical delay portion is made of a light-transmitting medium selected from the group consisting of air and material composed of at least two substances exhibiting a minimum temperature coefficient to an optical length.

To impart stable temperature characteristic to the optical multiplexer-and-demultiplexer, the optical delay portion imparting an optical band-pass characteristic needs to have an optical length which is temperature-stable. Therefore, the optical delay portion should be composed of elements whose path lengths and refractive indexes little depend on temperature. To be more specific, the optical delay elements must be made of a medium having a little thermal-optical effect, such as air. Alternatively, the waveguides must be designed so that product of the difference in length between any two adjacent waveguides and the effective refractive index of the optical delay portion is stable in spite of changes in temperature.

The temperature dependency of an optical multiplexer-and-demultiplexer will be described below.

The condition for diffraction is given as follows:

$$\Lambda \cdot (\sin\alpha + \sin\beta) = m \cdot \lambda / n \tag{1}$$

where $\Lambda$ is the groove spacing, $\alpha$ is the incident angle, $\beta$ is the diffraction angle, m is the order of diffraction, and $\lambda$ is the wavelength of the light beam, and n is the refractive index of the medium present near the surface of the diffraction grating. Differentiating the equation (1), we obtain the temperature dependency of the central transmission wavelength, which is represented by:

$$d\lambda/dT = \lambda \cdot (\sigma + n^{-1} \cdot dn/dT) \qquad (2)$$

where σ is the thermal expansion coefficient of the diffraction grating.

Hence, to reduce the temperature dependency of the wavelength transmission characteristic it is required that the diffraction grating be made of material which has a small thermal expansion coefficient and be placed in a medium whose refractive index changes only a little. Appropriate as materials of the diffraction are, for example, quartz glass and invar alloy.

If all waveguides of the optical multiplexer-and-demultiplexer are made of quartz (that is, the surface of the diffraction grating is covered with quartz layer), the temperature dependency will be about 0.012 nm/°C. as is seen from the equation (2), provided that $\sigma=0.55\times10^{-6}$ (1/°C.), $n=1.444$, $dn/dT=10^{-4}$ (1/°C.), and $\lambda=1.55$ μm. In a multiplexer-and-demultiplexer designed for high-density wavelength multiplex optical communication wherein the channel-wavelength intervals are 1 nm, however, the full width of half maximum transmission (or −3 dB bandwidth of the transmission spectrum) must be about 0.3 to 0.5 nm. The wavelength transmission characteristic of this wavelength multiplexer-and-demultiplexer is not good enough to compensate for changes in the ambient temperature, which amount to tens of degrees centigrade. As a consequence, no sufficient transmitting-receiving characteristic can be imparted to the communication system which incorporates the multiplexer-and-demultiplexer.

Therefore, the integrated optical multiplexer-and-demultiplexer according to the present invention has an air layer located near the surface of the diffraction grating. Air is a medium whose refractive index changes with temperature at a rate of only $-2.6\times10^{-7}$ (1/°C.). When the blank material is quartz glass, the temperature dependency of wavelength transmission characteristic is about 0.0005 nm/°C. Thus, the integrated optical multiplexer-and-demultiplexer has sufficient temperature stability, though it has no temperature-adjusting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 12A and 12B are diagrams showing an integrated optical multiplexer-and-demultiplexer according to a third embodiment of this invention;

FIG. 13 is a diagram depicting a mode of connecting the filter elements in the third embodiment;

FIG. 14 is a diagram showing an integrated optical multiplexer-and-demultiplexer according to a fourth embodiment of the present invention;

FIGS. 15A and 15B are diagrams explaining how a medium is used to stabilize the optical length of the optical delay portion in the fourth embodiment;

FIG. 16 is a sectional view of the region 70 shown in FIG. 15A;

FIGS. 17A to 17C are sectional views of three types of the region 71 shown in FIG. 15A;

DETAILED DESCRIPTION OF THE PREFERRED EMBODIMENTS

FIGS. 1A, 1B, 2A and 2B show an integrated optical multiplexer-and-demultiplexer according to the first embodiment of the present invention.

Figure 1A:
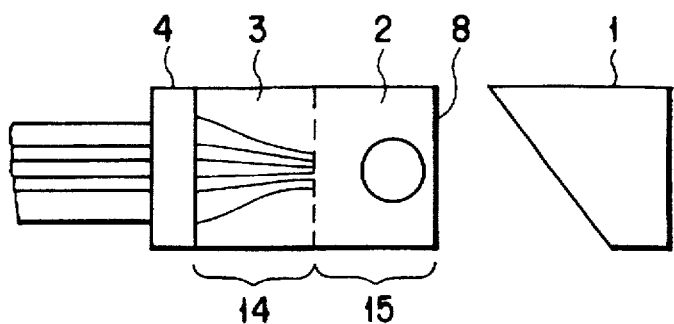
FIGS. 1A and 1B are diagrams showing an integrated optical multiplexer-and-demultiplexer according to a first embodiment of the present invention.
Figure 1B:
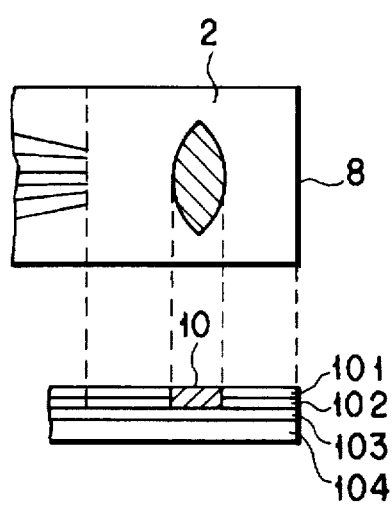

As shown in FIG. 1A, the integrated optical multiplexer-and-demultiplexer comprises a waveguide unit including a diffraction grating 1, a lens 2, an arrayed waveguide 3 and an optical-fiber array port 4. In this waveguide unit, the portion between the end surface of the optical fiber array port 4 and the input/output end surface 16 of the arrayed waveguide 3 constructs a three-dimensional waveguide 14 and the portion between the input/output end surface 16 and the end surface 8 of the lens 2 constructs a two-dimensional waveguide 15. The lens 2 may comprise a Luneburg type lens, a geodesic type lens or a two-dimensional lens formed of high refractive index medium.

Figure 2A:
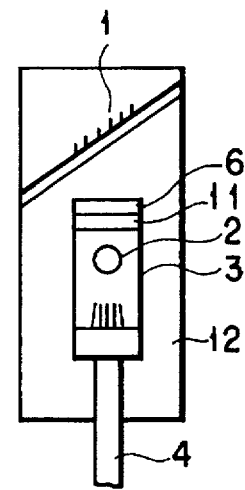
FIGS. 2A and 2B are diagram showing the optical multiplexer-and-demultiplexer of FIGS. 1A and 1B, in greater detail.
Figure 2B:
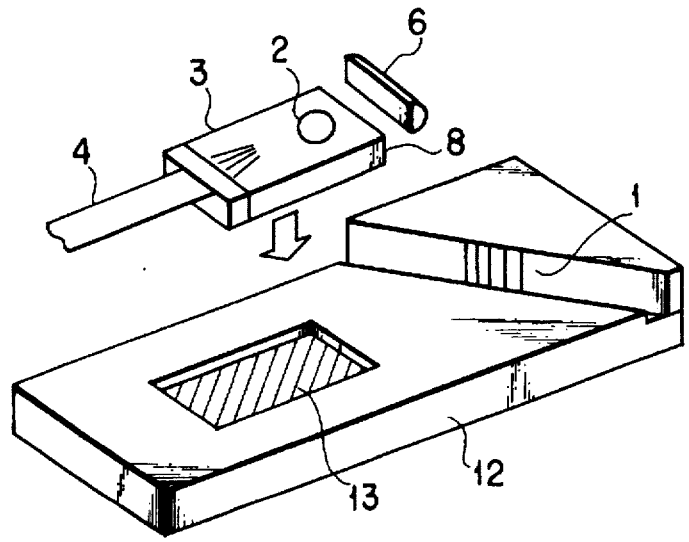

When light emitted from the end surface 8 at the rear of the lens 2 passes through a cylindrical lens 6 shown in FIGS. 2A and 2B which is used as a collimator, the light is collimated by the collimator 6. The collimated light is incident to the diffraction grating 1. Accordingly if the angle at which the collimated light applied to the grating 1 is adjusted at a suitable value, the optical multiple and demultiplex functions can be realized in an available band of wavelength.

The two-dimensional waveguide 15 may be a quartz waveguide, a semiconductor waveguide or the like. Such two-dimensional waveguide is slanted and polished on its end surface or is covered with an antireflection coating (anti-reflective film) to prevent the reflected light from being combined with the main light. The diffraction grating 1 is either a silicon grating whose grating surface can be easily formed by anisotropic etching or a replica grating having a substrate formed of low-expansion material. The silicon grating may be one made of silicon crystal whose crystal axis is suitably selected and which has been subjected to anisotropic etching, as is disclosed in IEEE Journal of Quantum Electronics, Vol. QE-16, No. 2, February 1980. If the side surface of the substrate of the silicon grating is metalized, the silicon grating can be soldered to the device substrate. The replica grating is hard to secure to the device substrate by soldering, because it contains resin which is not heat-resistant. Thus, the substrate of the replica grating may be made of an Fe-Ni-Co alloy such as Kovar (tradename) or invar. In this case, the substrate can be secured to the device package by laser welding, thus achieving metal-to-metal welding, not damaging the grating surface which contains resin.

Figure 3:
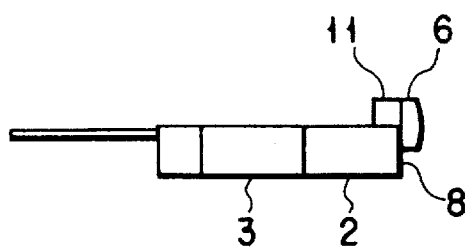
FIG. 3 is a diagram explaining how the lens is amounted on the waveguide element in the multiplexer-and-demultiplexer of FIGS. 1A and 1B.
Figure 4:
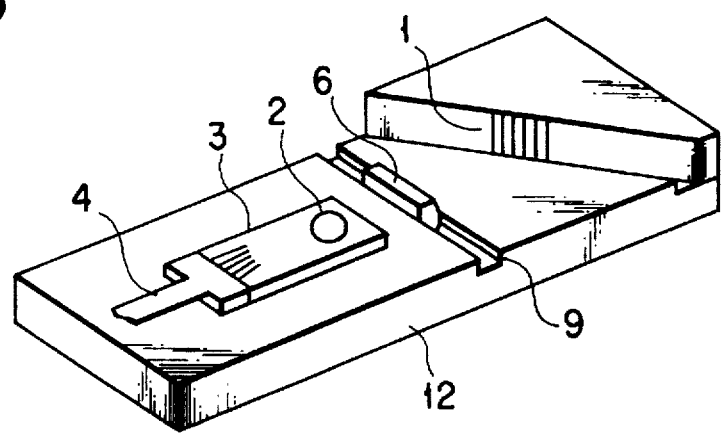
FIG. 4 is a perspective view explaining how the lens is mounted on the device substrate.
Figure 5:
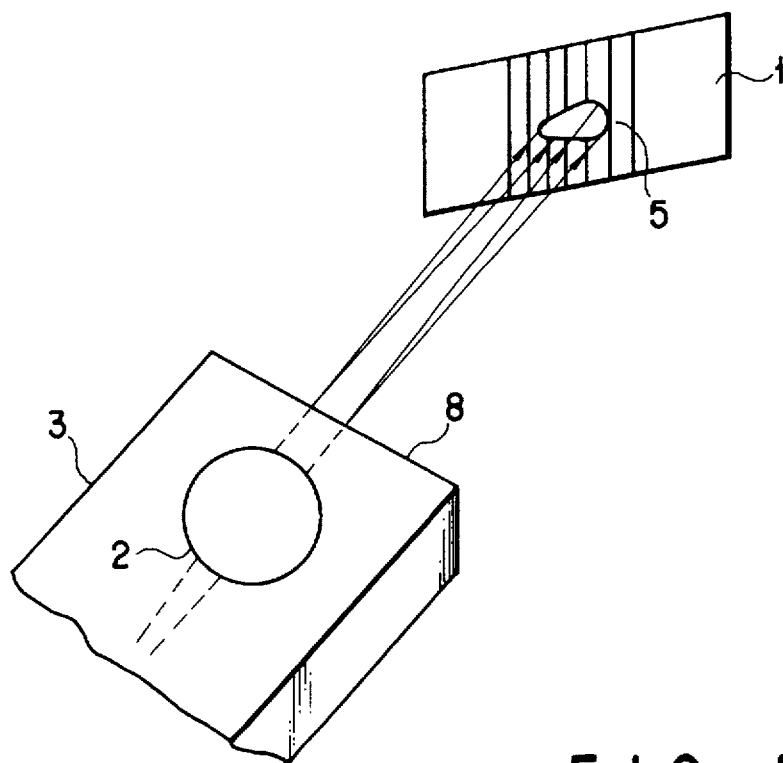
FIG. 5 is a diagram representing how the light is applied from the waveguide onto the diffraction grating in the multiplexer-and-demultiplexer of FIGS. 1A and 1B.

The light emitted from the surface 8 of the two-dimensional waveguide 15 is dispersed in the vertical direction. Therefore, the cylindrical lens 6 is located at a suitable position to collimate the light. More specifically, the lens 6 can be arranged in two alternative ways as shown in FIGS. 3 and 4. In the case shown in FIG. 3, the lens 6 is bonded to the surface 8 of the three-dimensional waveguide 15 and fixed to the lens 2 with optical adhesive 11. In the case shown in FIG. 4, a groove 9 is cut in an appropriate part of the waveguide substrate 12 by a dicing machine or the like, the lens 6 is fitted in the groove 9, and the waveguide unit is secured to the substrate 12 such that the surface 8 opposes the lens 6. The diffraction grating 1 is mounted on the waveguide substrate 12 at the side facing away from the waveguide unit, such that the slant grating surface 5 opposes the lens 6.

There is a method of reducing the vertical dispersion of the light from the surface 8, without using an optical element such as a lens. The method is using a waveguide having a core expanded at a position adjacent to the opening of the waveguide. Various techniques of expanding the core are known. As is disclosed in, for example, IEICE TRANS. COMMUN. 76-B, 1, 1993, pp. 36, the waveguide may be locally heated, thermally diffusing the dopant in the core to decrease the Δ value of the waveguide. Alternatively, as disclosed in Electron. Lett., 25, 13, 1980, pp. 849, the waveguide may be subjected to flame deposition if it is a quartz waveguide, thereby to control the Δ value minutely. Whichever method is employed to expand the core, the distance between the waveguide surface 8 and the grating surface of the refraction grating 1 is set as small as possible so that the height of the spot of the light slightly emitted in a vertical direction is not shifted in position.

The optical multiplexer-and-demultiplexer according to the first embodiment of the invention may have the diffraction grating 1 made directly on the device substrate by etching or vapor deposition. How this type of the optical multiplexer-and-demultiplexer is manufactured will be explained, with reference to FIGS. 6A to 6D.

Figure 6A:
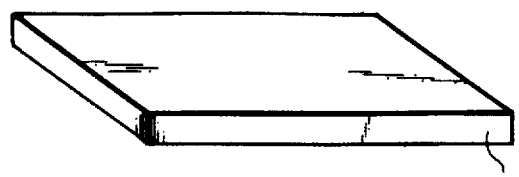
FIGS. 6A to 6D are perspective views, explaining a method of manufacturing the Littrow multiplexer-and-demultiplexer of FIGS. 1A and 1B.
Figure 6B:
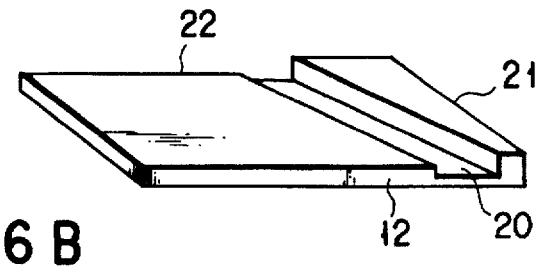
Figure 6C:
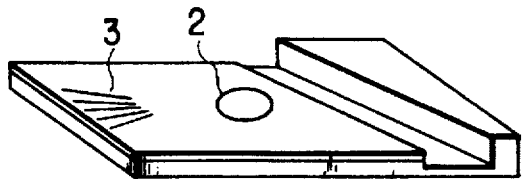
Figure 6D:
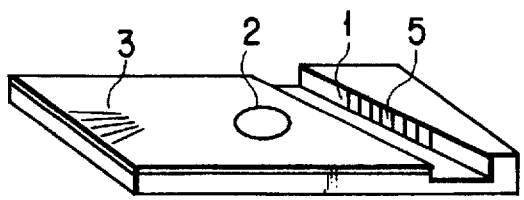

First, a silicon substrate 12 of the type shown in FIG. 6A is prepared. As shown in FIG. 6B, the substrate 12 is worked by etching to form a groove 20 on its surface so that a diffraction-grating section 21 and a waveguide unit section 22 are divided by the groove 20. Next, as shown in FIG. 6C, a lens 2 and a three-dimensional arrayed waveguide 3 are formed on the waveguide unit section 22. Thereafter, as shown in FIG. 6D, a grating surface 5 is formed on the slant end surface of the diffraction-grating section 21 by means of anisotropic etching and Au-code deposition, whereby a diffraction grating 1 is completed.

As indicated above, the diffraction grating 1 is made by etching on the two-dimensional quartz waveguide. Hence, in a case of forming the diffraction grating 1 on the waveguide substrate 12, the diffraction grating 1 (a grating surface bent stepwise) having a coarse grating spacing can be formed easily and, thus, at low cost. To reduce the device size, the device is constructed in accordance with high-order diffraction condition, using the diffraction grating 1 of Echelle type which has a blaze grating having a large blaze angle and which has no particular blaze wavelength. In a case of the high-order diffraction, the blaze wavelength of the order different from that of the diffraction of the wavelength multiplex light are likely to overlap with optical signals in the usable wavelength band (1.55 μm±10 nm) at the edge of the three-dimensional arrayed waveguide 3.

In a case of a wavelength multiplex optical communication in a long-distance system, a number of optical-fiber amplifiers must be used. As a result, arise a problem in that the excited light mixes into signal light beams (particularly, when the amplifiers perform forward excitation). That is, light beams from the excitation light source connected to the optical-fiber amplifiers (e.g., light beams having a wavelength of 1.48 μm or 0.98 μm) are diffracted by almost the same angle as the wavelength-multiplexed signal light beams and supplied to the three-dimensional arrayed waveguide 3, inevitably decreasing the S/N ratio of the signals reaching the arrayed waveguide 3.

Figure 7:
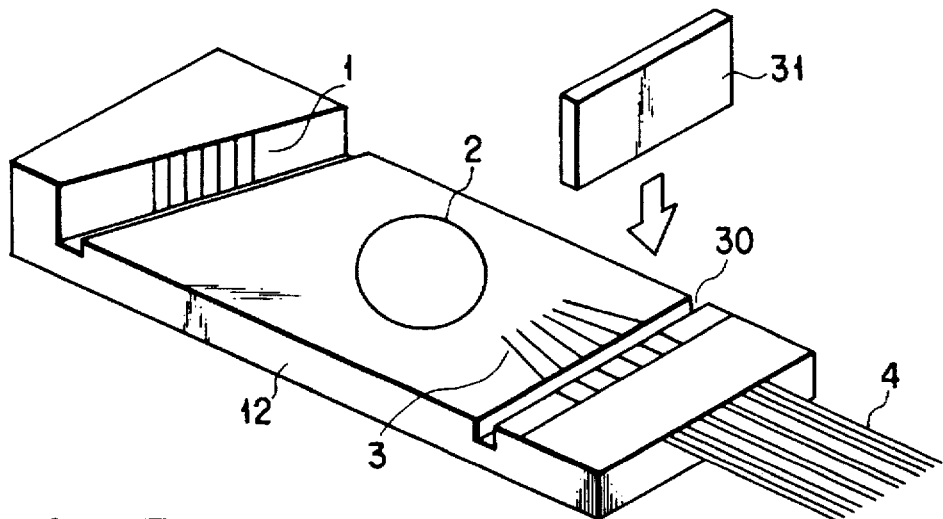
FIG. 7 is a perspective view showing an optical filter provided in a three-dimensional waveguide.

Various methods can be used to prevent the excited light from mixing into the signal light beams. One method is to impart no excessive grating spacing to the diffraction grating 1. Another method is to cut a groove 30 in the surface of the waveguide 3 by a dicing machine and fit a band-pass filter 31 (e.g., a dielectric multi-layered filter) in the groove 30, as shown in FIG. 7, for removing the excited light.

Figure 8A:
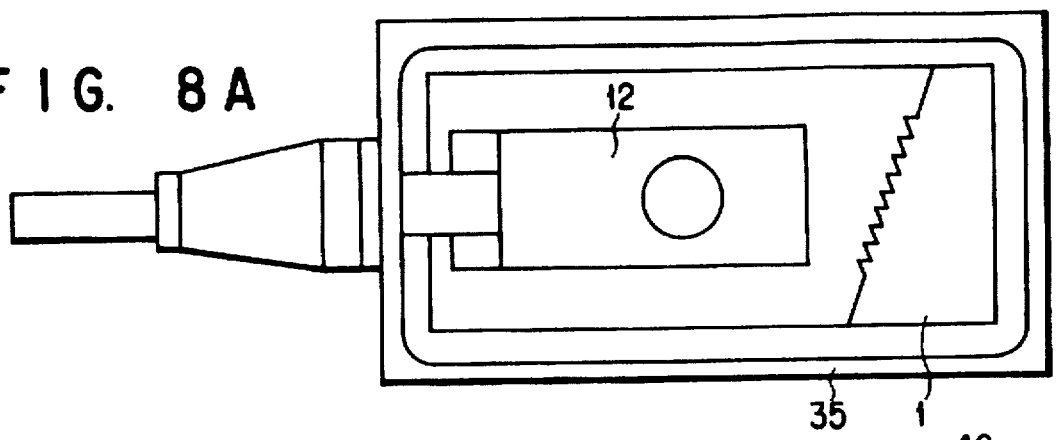
FIGS. 8A and 8B are diagrams showing a device package.
Figure 8B:
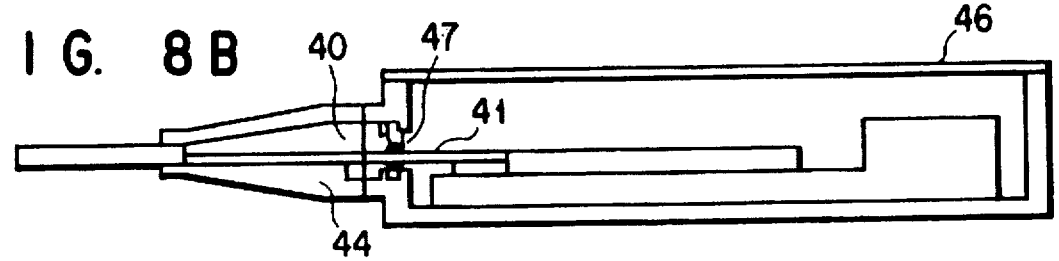

To be resistant to the environmental elements, all elements constructing the integrated optical multiplexer-and-demultiplexer must be properly packaged and the arrayed waveguide and the arrayed fiber must be properly coupled with each other. At present, the dominant method of coupling the arrayed waveguide with the optical fiber is to hold them at edge to edge (or end to end), and apply adhesive to the edges thereof. The adhesive cannot remain resistant to humidity for a long time, however. The coupled edge portions of the waveguide and optical fiber need to be set in airtight seal. That is, the optical multiplexer-and-demultiplexer should be concealed within an airtight package 35 as shown in FIGS. 8A and 8B. In this case, the optical fiber array 41 passing through the opening section 40 of the package 35 must to be secured with solder 47 or the like, filling the opening section 40 with the solder 47 or the like.

Figure 9A:
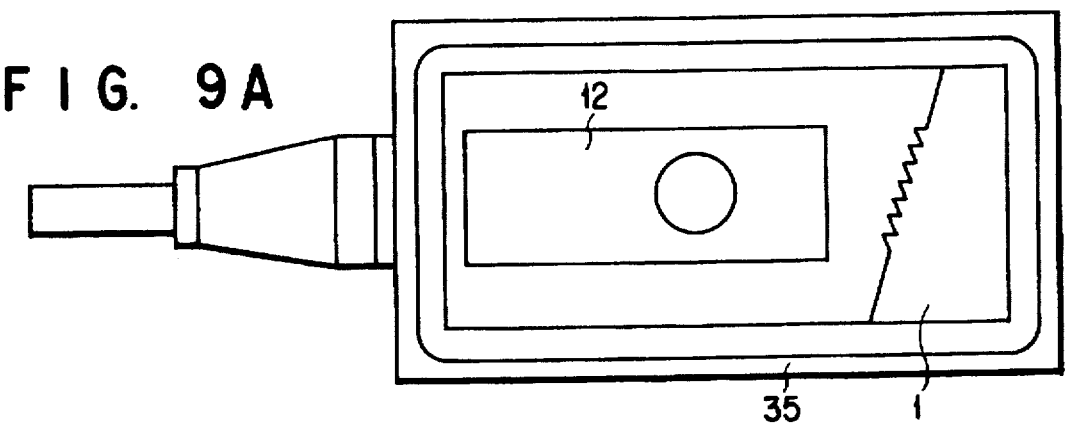
FIGS. 9A to 9C are diagrams illustrating another type of a device package.
Figure 9B:
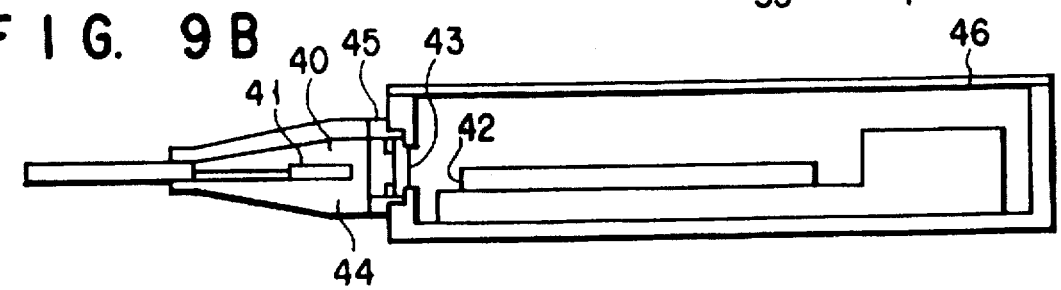
Figure 9C:
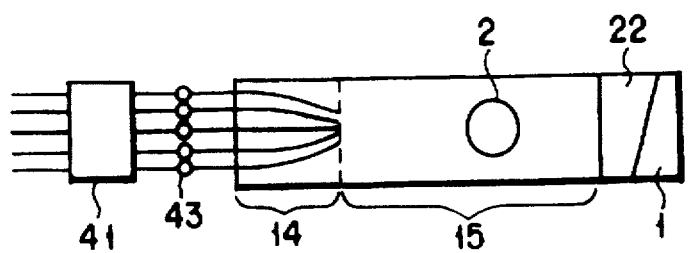

In an airtight structure as shown in FIGS. 9A to 9C, a sealed window is made in the opening section 40, and the optical fiber array 41 are optically coupled to the arrayed waveguide 42 by arrayed micro-lens elements 43. The micro-lens elements 43 serve as the sealed window; they are secured to the airtight package 35 with solder. The optical fiber array 41 comprises an array holder 44 having V-grooves cut in a surface, glass capillary tubes secured in the V-grooves by soldering, and optical fibers passing through the glass capillary tubes. The array holder 44 is fixed to the projecting part 45 of the package 35 by laser welding, and a lid 46 is seam-welded to the package 35. The optical multiplexer-and-demultiplexer is thereby sealed as a whole within the package 35 in airtight fashion.

An arrayed waveguide for use in an integrated optical multiplexer-and-demultiplexer, which is the second embodiment of the invention, will be described with reference to FIGS. 10A to 10D.

A method of manufacturing the arrayed waveguide will be explained.

Figure 10A:
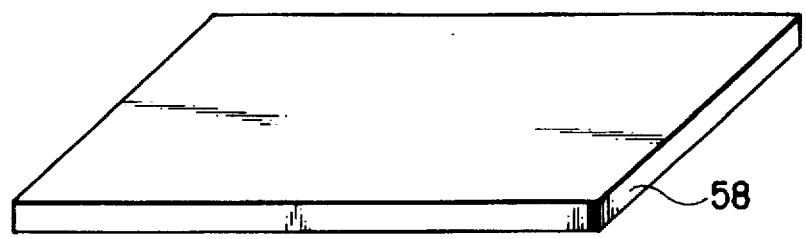
FIGS. 10A to 10C are perspective views, explaining a method of manufacturing an integrated optical multiplexer-and-demultiplexer according to a second embodiment of the invention.
Figure 10B:
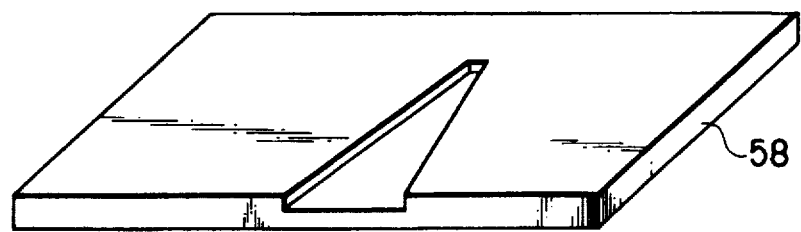
Figure 10C:
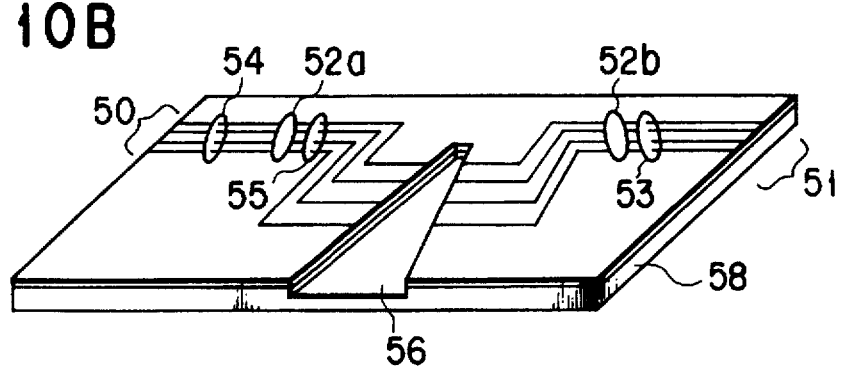

At first, a substrate 58 of the type shown in FIG. 10A is prepared. As shown in FIG. 10B, a triangular recess having a flat bottom is cut in the upper surface of the substrate 58, defining a triangular air layer 56. Further, as shown in FIG. 10C, input-output arrayed waveguide ports 50 and 51 are provided on the sides of the air layer 56, respectively, and two-dimensional waveguides 52a and 52b are provided between the respective arrayed waveguide ports 50 and 51 and the air layer 56.

In operation, the two-dimensional waveguide 52a divides the light emitted from, for example, a port 54 provided in the arrayed waveguide port 50, into light beams. The light beams are distributed to ports 55 and applied to the waveguides. The light beams are delayed in the waveguides by different times since the waveguides have optical length which are slightly different, one from another. At the port 53, the delayed light beams are merged together. As a result, the light is led to the waveguide of the port corresponding to the wavelength. In the second embodiment, the triangular air layer 56 functions as the light-delaying section. The transmission characteristic is determined by the optical length difference between the waveguides in the delay circuit (i.e., air layer) and the number of branched waveguides.

If the waveguides greatly differ in optical length and, therefore, have greatly difference between mode field diameters when the light beams are coupled to the waveguides because the light beams radiate in the air layer 56, the coupling loss will be large. To prevent a large coupling loss, each pair of waveguides which are optically connected have a large core diameter at their ends which oppose across the air layer 56, thereby suppressing the radiation of the light beams in the air layer 56.

Figure 11:
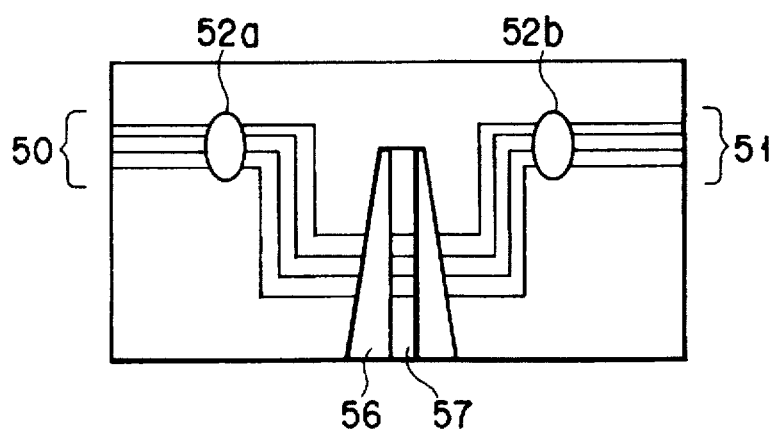
FIG. 11 is a plan view of a modification of the second embodiment of the invention.

Arrayed elements are intensively studied for their possible use in quartz waveguides and semiconductor waveguides. In the second embodiment, the integrated arrayed elements work effectively in either of the quartz waveguides and the semiconductor waveguides. The air layer 56 may be filled with a medium such as SK16 glass, whose refractive index depends a little on temperature. In this case, the substrate 58 must be made of a material which has almost the same thermal expansion coefficient as the medium, in order to make optical multiplexer-and-demultiplexer structurally stable. To be more specific, when the medium is SK16 glass whose thermal expansion coefficient is about $7\times10^{-6}$ (1/K), thus providing quartz waveguides, the substrate 58 should be made of sapphire whose thermal expansion coefficient is $6\times10^{-6}$. Alternatively, as shown in FIG. 11, a lens array or an arrayed waveguide 57, either shaped like a plate, may be provided in the middle portion of the air layer 56 in order to suppress the radiation of the light beams in the air layer 56.

Arrayed waveguides for use in an integrated optical multiplexer-and-demultiplexer, which is the third embodiment of the invention, will be described with reference to FIGS. 12A and 12B. The third embodiment is an integrated Mach-Zehnder filter element.

FIG. 12A shows an arrayed waveguide, which has two input-output waveguide ports 50 and 51 provided on a substrate 59. Two waveguides 61a and 61b having different lengths are provided on the substrate 59, both extending from the input-output waveguide port 50 to the input-output waveguide port 51.

FIG. 12B illustrates another type of an arrayed waveguide, which has two input-output waveguide ports 50 and 51 provided on a substrate 59. Two waveguides 61c and 61d having different lengths are provided on the substrate 59, both extending from the input-output waveguide port 50 to the input-output waveguide port 51. The waveguide 61c is straight. The waveguide 61d is bent at several portions and much longer than the waveguide 61c. The substrate 59 has a recess which provide an air layer 60. The air layer 60 cuts the waveguide 61d at the middle portion thereof. The cores of those portions of the waveguide 61d which oppose across the air layer 60 flare toward the sides of the air layer 60.

The Mach-Zehnder filter has a wavelength transmission characteristic which is represented by sine waves. It comprises filter elements which have different cycles and which are connected as shown in FIG. 13, constituting an optical wavelength demultiplexer. Each filter element may consist of the filter element shown in FIGS. 12A or 12B.

The cycle of the wavelength transmission characteristic of the Mach-Zehnder filter is proportional to an amount of optical delay. Accordingly, if the filters having different optical delay amounts are connected in multi-stage as shown in FIG. 13, the wavelength transmission characteristic capable of passing the optical signal of a desired channel is obtained. In the concrete, the optical delay amount can be extracted for each channel by superposing filters having cycles different from one another by even-number multiple.

The air layer 60 (FIG. 12B) functioning as an optical delay portion is formed by removing a portion of the substrate 59 by a dicing machine or by etching the substrate 59. The length of the air layer 60 (i.e., the optical delay portion) is in the order of millimeters (mm) if the light beams to be multiplexed differ in wavelength by about 1 nm. In this case, the coupling loss among the waveguides is extremely large. To reduce the coupling loss, the radiation of the light beams in the air layer 56 must be controlled. To this end, the cores of the edge portions of each waveguide which oppose across the air layer 60 are flared (for example, by thermally diffusing the dopant in the cores). Alternatively, a lens made of material having a little thermal-optical effect may be inserted into the air layer 60 and located between the edge portions of the waveguide to optically couple the edge portions.

An arrayed waveguide for use in an integrated optical multiplexer-and-demultiplexer, which is the fourth embodiment of the invention, will be described with reference to FIG. 14. This arrayed waveguide comprises waveguides, each having an optical delay portion which has an upper cladding layer made of silicone resin or the like and which exhibits a stable temperature characteristic regardless of its optical length.

As shown in FIG. 14, the arrayed waveguide comprises a substrate 58, two input-output waveguide ports 50 and 51, and two-dimensional waveguides 52a and 52. The ports 50 and 51 are mounted on the substrate 58 and coupled with the waveguides 52a and 52b, respectively. The waveguides 52a and 52b are coupled together by an array 61 of waveguides which have different optical lengths. A triangular medium region 71 is located at the middle part of the waveguide array 61.

The cross section of the region 70 outside of the triangular region 71 is shown in FIG. 16. The region 70 is formed of a substrate 74, a cladding layer 73 and a plurality of cores buried in the cladding layer 73.

FIGS. 17A to 17C show three types of the region 71, respectively. In a first type, the region 71 is formed of a substrate 74, a lower cladding layer 73, a plurality of cores 72 buried in the lower cladding layer 73 and an upper cladding layer 75 superposed on the lower cladding layer 73. In this first type, the upper cladding layer 75 is superposed on the thin surface film of the lower cladding layer 73. In a second type, the surface film of the lower cladding layer 73 is etched until the surfaces of the cores 72 is exposed and then the upper cladding layer 75 is deposited on the lower cladding layer 73. In third type, the lower cladding layer 75 is formed so as to surround the cores 72 and then the upper cladding layer 75 is deposited on the lower cladding layer 73.

The optical characteristics of the arrayed waveguide shown in FIG. 14 will be described, with reference to FIGS. 15A and 15B. Assuming that two-dimensional waveguide is used.

FIGS. 15A and 15B show the delay portions of the waveguides forming the array 61. The delay portions are illustrated as if extending straight and parallel to one another. Located in a region 70 are quartz-based three-dimensional waveguides. Located in a region 71 (i.e., the medium 71) are those portions of the waveguides whose upper cladding layer is made of material other than quartz. The difference $\Delta L(T)$ between the optical lengths of those portions of any two adjacent waveguides which are located in the regions 70 and 71 is given as follows:

$$\Delta L(T) = nq(T) \cdot \Delta(T) \cdot \tan\theta_B$$

$$-nq(T) \cdot \Delta(T) \cdot \tan\theta_A + nr(T) \cdot \Delta(T) \cdot \tan\theta_A \quad (3)$$

where $\Delta(T)$ is the array interval, $nq(T)$ is the effective refractive index of the region 70, and $nr(T)$ is the effective refractive index of the region 71. $\Delta(T)$, $nq(T)$ and $nr(T)$ have the temperature dependencies specified below:

$$\Delta(T) = \Delta o \cdot (1 + \alpha \cdot T) \quad (4)$$

$$nq(T) = nqo \cdot (1 + \beta q \cdot T) \text{(quartz)} \quad (5)$$

$$nr(T) = nro \cdot (1 + \beta r \cdot T) \text{ (resin, etc.)} \quad (6)$$

Optics Letters, Vol. 17, No. 7, pp. 499, 1992 teaches that the wavelength transmission characteristic of a multiplexer-and-demultiplexer of arrayed waveguide grating type is determined by an amount of position dispersion, $dx/d\lambda$, which is given as:

$$dx/d\lambda = f \cdot nq \cdot \Delta L/(ns \cdot \Delta \cdot \lambda) \quad (7)$$

where ns is the effective refractive index of the slab waveguide. Here, ns and nq can be regarded as having the same temperature gradient. Hence, the wavelength transmission characteristic of the multiplexer-and-demultiplexer will be very stable if $\Delta L$ is affected by the temperature. In the equation (3), the term of temperature T is:

$$nqo(\alpha + \beta q) (\tan\theta_B - \tan\theta_A)$$

$$+ nro(\alpha + \beta r) \tan\theta_A \quad (8)$$

To make the wavelength transmission characteristic, it suffices to apply conditions which change this term to zero (0). Such conditions can be determined from the parameters ($\Delta o = 25$ μm, $\Delta Lo = 122.7$ μm) recited in Optics Letters. Of the terms relating to $\Delta L$, any term that does not depend on temperature should satisfy the following equation:

$$2 \cdot \{nqo \cdot (\tan\theta_B - \tan\theta_A) nro \cdot \tan\theta_A\} = \Delta Lo/\Delta o \quad (9)$$

Applying the results which makes the term (8) zero, to the equation (9), we obtain:

$$nro \cdot (\beta - \beta q) = -(\alpha + \beta q) \cdot \Delta Lo/(\Delta o \cdot \tan\theta_A 2) \quad (10)$$

Figure 18:
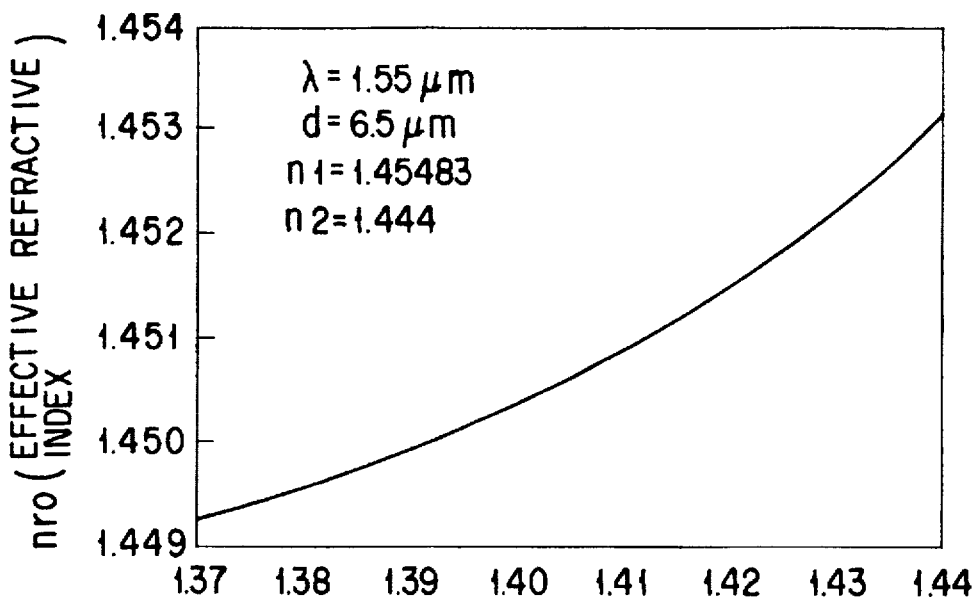
FIG. 18 is a graph representing the relationship between the refractive index of the upper cladding layer and the effective refractive index of the waveguide, observed in the fourth embodiment.

FIG. 18 represents the relationship between the refractive index $n_3$ of the upper cladding layer and the effective refractive index nro of the waveguide, which is observed in the fourth embodiment. The value for $\beta r$ is almost identical to the product of the slope of the line shown in FIG. 18 and the thermal-optical coefficient of the upper cladding layer. When $n_3$ ranges from 1.43 to 1.44, the slope $\delta nro/\delta n_3$ is approximately 0.103. Thus, $\beta r$ is about one-tenth of the thermal-optical coefficient of the upper cladding layer. The value of the right-hand side of the equation (10) is in the order of $\alpha + \beta q$ in practice. The value $\alpha + \beta q$ is about $10^{-5}$ (1/°C.) for quartz-based waveguides. Hence, $\beta r$ needs to be in the order of $10^{-5}$ and a negative value. It is therefore desirable that the upper cladding layer have a thermal-optical coefficient of $-10^{-4}$ or thereabout. To state more precisely, the upper cladding layer should be made of plastics such as silicone resin or PMMA.

Figure 19:
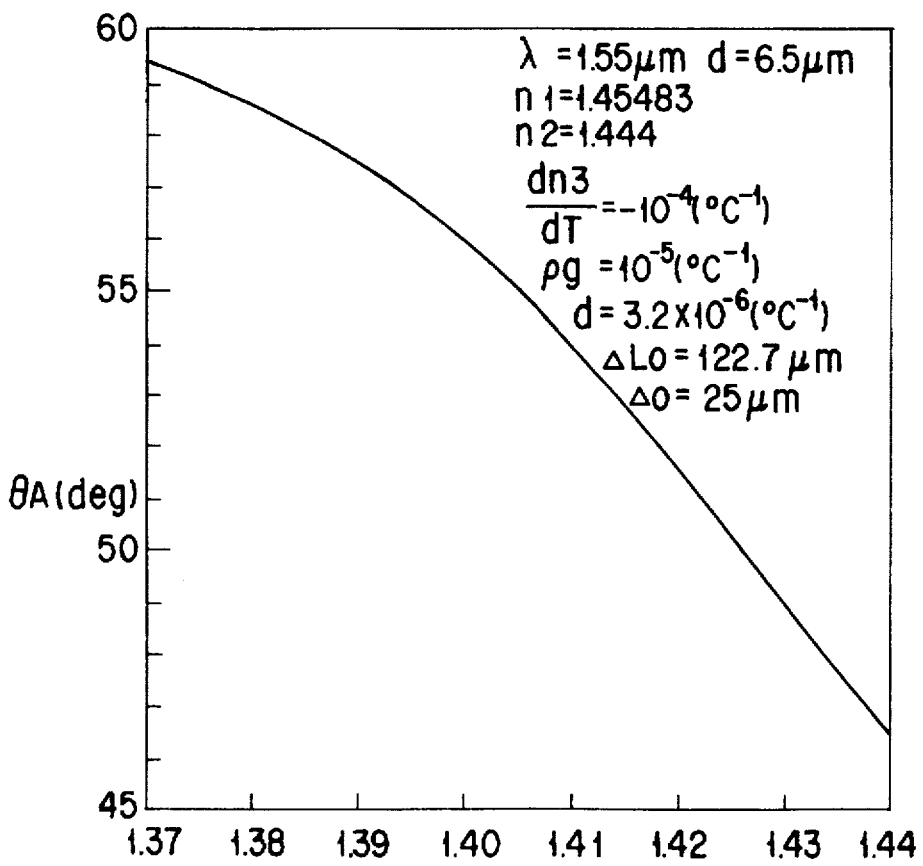
FIG. 19 is a graph showing the relation between the refractive index of the upper cladding layer and the angle $\beta_A$ calculated by applying various known values to the fourth embodiment.

If $\beta r = 1.03 \times 10-5$, $\beta q = 10^{-5}$, $nro = 1.45304$, $n_1 = 1.45483$, $n_2 = 1.444$, $\alpha = 3.2 \times 10^{-6}$, the angle $\theta_A$ will be 48.55°. As seen from FIG. 18, the smaller the refractive index of the upper cladding layer, the less the slope $\delta nro/\delta n_3$, and the less the r. Therefore, the angle $\theta_A$ increases as can be understood from FIG. 19.

In the resin-filled portion of each waveguide, the upper and lower cladding layers have different refractive indexes. Hence, when the deflected waves change in direction, the effective refractive index of the waveguide varies. In this case, the wavelength transmission characteristic of the multiplexer-and-demultiplexer inevitably depends upon the deflection of waves. To prevent this, it is necessary to cut a groove in the middle part of the arrayed waveguide by a dicing machine and to fit a $\lambda/2$-plate in the groove, as is disclosed in Optics Letter.

In the fourth embodiment, that portion of the upper cladding layer of each waveguide which delays an optical signal is made of a medium whose refractive index decrease with temperature so that the optical multiplexer-and-demultiplexer has wavelength transmission characteristic which remains stable despite changes in temperature. This method is effective, too, when applied to a Littrow multiplexer-and-demultiplexer and a multiplexer-and-demultiplexer incorporating a multi-stage Mach-Zehnder filter. Also, even if the calculation method and principle described above is applied to three-dimensional waveguide, the similar processing can be realized.

As has been described, the present invention provide an integrated optical multiplexer-and-demultiplexer in which the arrayed waveguide and the lens are arranged on the same waveguide substrate. The multiplexer-and-demultiplexer can therefore operate stably and can be manufactured in large quantities. Further, the multiplexer-and-demultiplexer can have reliable and stable wavelength transmission characteristic because the medium present on the surface of the diffraction grating is air and because the diffraction grating functioning as a waveguide element is provided on the waveguide substrate.

Furthermore, the present invention can also provide a multiplexer-and-demultiplexer of arrayed waveguide grating type and a multiplexer-and-demultiplexer incorporating a multi-stage Mach-Zehnder filter, which have the same advantages as described above. Since that portion of the upper cladding layer of each waveguide is made of a medium whose refractive index decrease with temperature, the multiplexer-and-demultiplexer of either type has wavelength transmission characteristic which remains stable despite changes in temperature..

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An integrated optical multiplexer-and-demultiplexer for use in wavelength multiplex optical communication, comprising:

an arrayed waveguide;

a lens secured to one end of said arrayed waveguide;

a diffraction grating opposing said lens;

an optical delay portion between said lens and said diffraction grating, which imparts an optical band-pass characteristic and which is made of one of air and a light-transmitting medium composed of substances exhibiting a minimum temperature coefficient to an optical length; and a cylindrical lens for collimating light emitted from said lens.

2. The multiplexer-and-demultiplexer according to claim 1, wherein said cylindrical lens is secured to an end of said lens.

3. The multiplexer-and-demultiplexer according to claim 1, wherein said cylindrical lens is held between said lens and said diffraction grating.

4. An optical multiplexer-and demultiplexer comprising:

an arrayed waveguide device including a substrate, an array of waveguides provided on said substrate and having different lengths, at least one pair of input-output waveguide ports, and two-dimensional waveguides coupled with said input-output waveguide ports, respectively; and an optical delay portion located at a part of said array of waveguides and formed of light-transmitting medium imparting an optical band-pass characteristic and exhibiting a minimum temperature coefficient to an optical length, said light-transmitting medium being a temperature compensation region, said temperature compensation region being gradually narrowed in width in an array direction in which said waveguides of said array of waveguide are arrayed.

5. The multiplexer-and-demultiplexer according to claim 4, wherein said light-transmitting medium of said optical delay portion comprises a three-dimensional waveguide made of quartz-based material and a three-dimensional waveguide made of non-quartz-based material.

6. The integrated optical multiplexer-and-demultiplexer according to claim 4, wherein said light-transmitting medium of said optical delay portion comprises a recess formed in said substrate to form an air region therein.

7. The multiplexer-and-demultiplexer according to claim 4, wherein said temperature compensation region is formed of plastics.

8. The multiplexer-and-demultiplexer according to claim 4, wherein said temperature compensation region is made of glass other than quartz.

9. An integrated optical multiplexer-and-demultiplexer with a Mach-Zehnder filter for use in wavelength multiplex optical communication, comprising:

at least two input-output waveguide ports arranged on both sides of a substrate, respectively, and at least two waveguides provided on said substrate and having different lengths; and a temperature compensation region which is provided at a part of one of said waveguides.

10. The multiplexer-and-demultiplexer according to claim 9, wherein said temperature compensation region comprises a concave formed in said substrate and filled with air.

11. The multiplexer-and-demultiplexer according to claim 9, wherein said temperature compensation region is formed of resin.

12. The multiplexer-and-demultiplexer according to claim 9, wherein said one for said temperature compensation region is formed of glass other than quartz.

* * * * *